United States Patent

Devereux et al.

[15] 3,670,572

[45] June 20, 1972

[54] AIR-SEA INTERFACE TEMPERATURE MEASURING APPARATUS

[72] Inventors: Robert F. Devereux, Oxon Hill, Md.; Ernest L. Casco, San Diego, Calif.

[73] Assignee: The United States of America as represented by the Secretary of the Navy

[22] Filed: June 11, 1971

[21] Appl. No.: 152,141

[52] U.S. Cl. ............................73/342, 73/170 A, 73/170 R, 73/353
[51] Int. Cl. ..........................................................G01k 1/14
[58] Field of Search ................73/342, 340, 344, 353, 170 A, 73/170 R

[56] References Cited

UNITED STATES PATENTS

| 1,022,526 | 4/1912 | Barnes | 73/342 |
| 3,111,846 | 11/1963 | Willer | 73/353 |

*Primary Examiner*—Louis R. Prince
*Assistant Examiner*—Denis E. Corr
*Attorney*—R. S. Sciascia and Paul N. Critchlow

[57] ABSTRACT

Vertical distribution of temperature at the sea surface is measured by an array of temperature sensors extending upwardly and downwardly from a small float. The float is carried at the outboard end of a relatively long outrigger member which itself is pivotally carried by a buoy or ship so as to be in a free-swinging disposition capable of floatably riding the undulating sea surface to maintain the sensors at fixed positions relative to the surface both in the air and submerged.

9 Claims, 4 Drawing Figures

PATENTED JUN 20 1972 3,670,572

INVENTORS.
ROBERT A. DEVEREUX,
ERNEST L. CASCO,

By
ATTORNEY.

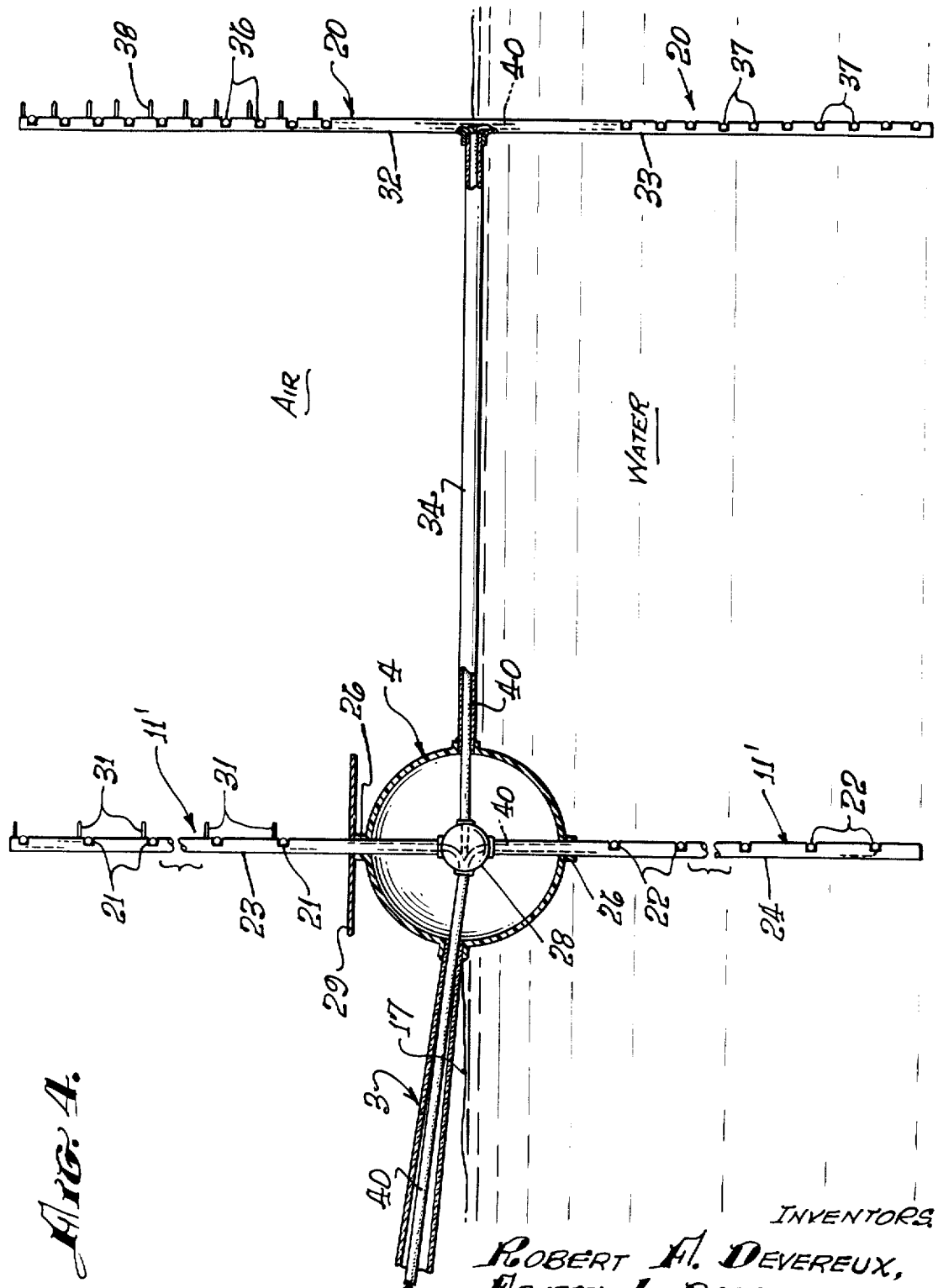

3,670,572

AIR-SEA INTERFACE TEMPERATURE MEASURING APPARATUS

BACKGROUND OF THE INVENTION

The present invention relates to the measurement of temperatures in the ocean and, in particular, to apparatus for obtaining a temperature profile in the immediate vicinity of the sea surface.

The United States Navy has a system of environmental buoys placed at selected locations throughout the ocean areas to provide weather data and other information used for forecasting and studying the sea environment. A variety of sensors and detectors are carried by the buoy to gather pertinent data which is processed and transmitted automatically to a central station. One difficulty however has been to provide a suitable sensor or temperature probe capable of accurately and continuously measuring the sea surface temperatures or, in other words, the relative temperatures of the air and sea water near the surface. Temperature data of this nature is significant in forecasting of storm generation or intensification, fog formations and other environmental events. Thermistor chains and other temperature probes have been used, but since, as has been stated, the problems are of determining the vertical distribution of temperature in, for example, the uppermost 100 cm of the water and the lowermost 100 cm of the air, these probes have not been wholly satisfactory. Such probes should be relatively simple, inexpensive, accurate, reliable and, of course, capable of withstanding the rigorous environmental conditions in which they will function. Also, they must present very little disturbance to the thermal structure and, in particular, their readings must be reliable even in heavy, tossing seas.

OBJECTS OF THE INVENTION

It is therefore an object of the present invention to provide apparatus for determining the vertical distribution of air-sea interface temperatures, the apparatus being entirely automatic in the sense it can be left in its operative disposition to provide continuous reliable data over a relatively long period of time.

Another object is to provide such apparatus in a simple, inexpensive manner which assures accurate and reliable information gathering over the period of time in which it is operative.

A further object is to provide the apparatus by using a plurality of thermistors each generating its own temperature data which then is relayed through suitable cabling to recording and telemetering systems carried by a support buoy or ship.

Another object related to the last object is to provide a thermistor system which is protected against the rigorous environmental conditions in which it operates.

Still another important object is to assure that the apparatus presents relatively little, if any, disturbance to the thermal structure of its environment.

These and other objects which will become apparent in the ensuing detailed description are achieved by employing a floating platform, such as the environmental buoy, as a support for an elongate tubular outrigger member which carries a small float member at its outboard end. The temperature sensors are thermistors which, in turn, are carried by the float member and which may be in the form of thermistor arrays extending upwardly and downwardly from the float. It is important that the float be sufficiently small to minimize the disturbance of existing thermal structures to be measured, although the float also must be sufficiently buoyant to floatably support the outrigger member which is carried in a free-swinging manner by the floating platform so as to permit the float to ride freely on the waves.

BRIEF DESCRIPTION OF THE DRAWINGS

The invention is illustrated in the accompanying drawings of which FIG. 4 is a view similar to FIG. 3 showing a modification of the temperature probe arrangement.

DETAILED DESCRIPTION OF THE INVENTION

Figure 1:
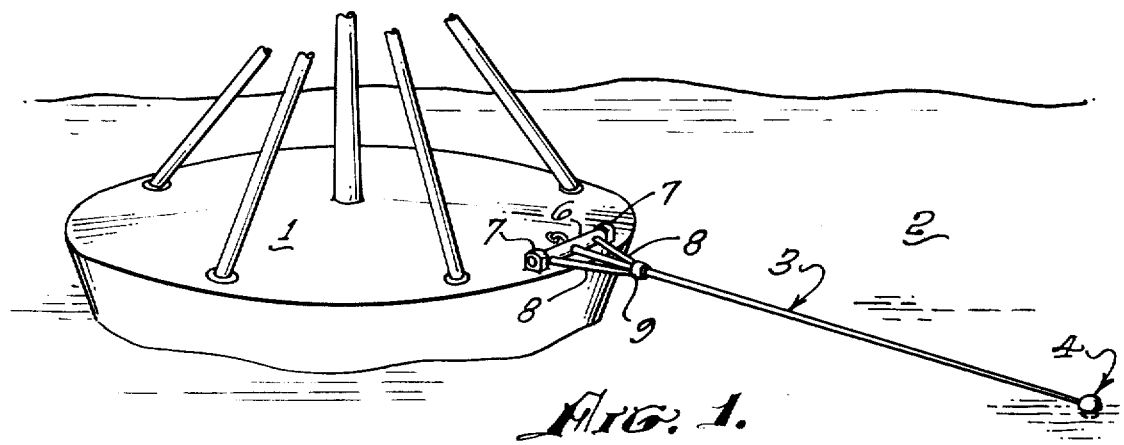
FIG. 1 is a perspective view of an environmental buoy and the outrigger member that supports the temperature probe.

Referring to FIG. 1, a large buoy 1, which may be the previously-discussed environmental buoy or any other buoyant body such as a ship, is shown afloat in an ocean environment 2 and, as will be seen, the buoy mounts an outrigger member 3 that carries a float member 4 at its outer end. Outrigger 3 is a hollow tubular member which in actual practice may be a tapered fiberglass pole with a contemplated length of about 20 feet so as to extend outwardly of the buoy a substantial distance sufficient to minimize disturbances produced by the buoy, particularly such disturbances as may alter the thermal structure of the environment in which the temperature measurements are to be made.

The inboard end of outrigger is journalled in and extends through a relatively-large pivot pin 6 rotatably supported on small cleats 7 carried on the upper surface of the buoy. Consequently, the outrigger is swingably supported on the horizontal axis of pivot pin 6 so that the outrigger with its float member 4 can floatably follow the undulating motion of the ocean waves. The pivotal mounting is strengthened and made more rigid by the use of short tubular braces 8 carried by a sleeve 9 mounted on the outrigger and coupled at their inboard ends to pivot pin 6.

Figure 2:
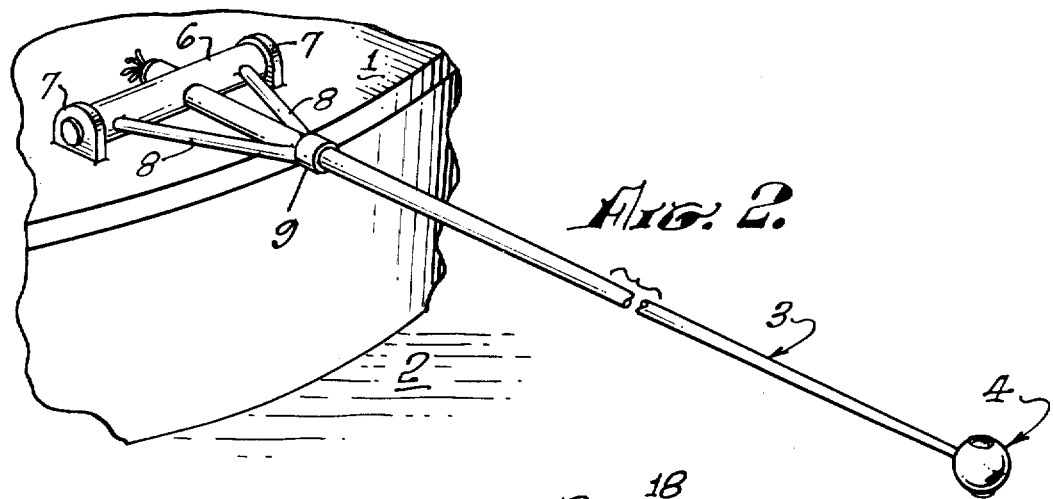
FIG. 2 is an enlarged view of the outrigger shown in FIG. 1.

As also may be noted in FIG. 2, the outrigger is a hollow or tubular member so that the conductors for coupling the temperature sensors into the telemetering system of the buoy can be lead through its hollow interior and on through a watertight fitting (not shown) into the protected interior of the buoy.

It, of course, is recognized that there are many known thermistor arrangements used to provide water temperature data and also, that some of these arrangements attempt to measure the temperature of the water near its surface. One of the features of the present arrangement resides in its use of the relatively long outrigger member as well as a relatively small float member 4 to keep the vertical temperature probes accurately located vertically with respect to the undulating water surface while itself disturbing existing thermal structure to a minimal extent.

Figure 3:
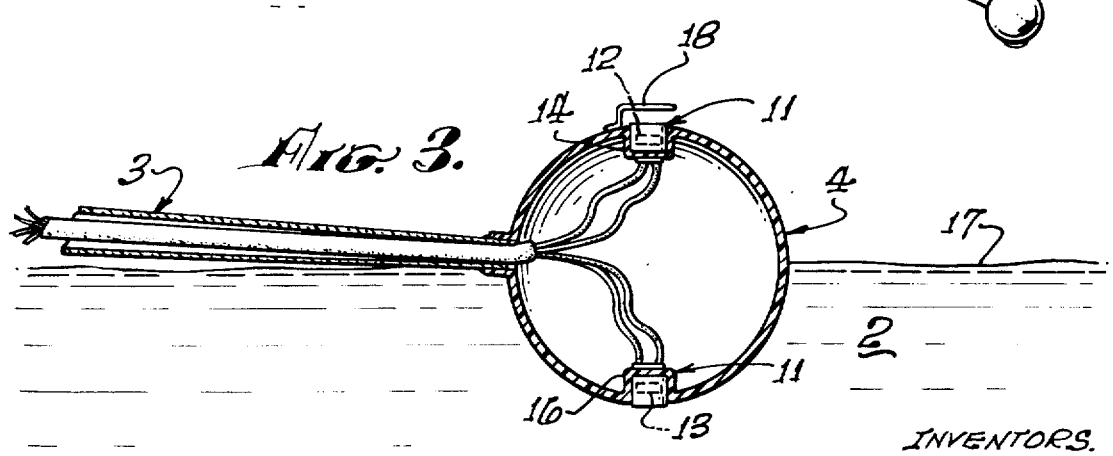
FIG. 3 is a sectional view through the end portion of the outrigger and the float which it carries.

To achieve these and other purposes, temperature sensing arrays 11 are carried by float member 4. In the embodiment shown in FIG. 3, the temperature arrays include thermistors 12 and 13 mounted directly in small cavities or pockets 14 and 16 formed in the float. To facilitate manufacture, as well as promote lightness and buoyancy, the float also can be made of the fiberglass used for the outrigger. Thermistor cavities 14 and 16 are disposed at diametrically opposite positions on the circumference of the float and, further, they are so disposed that when the float is secured to the outrigger, cavity 14 and its thermistor 12 will be in the uppermost location of the float and cavity 16 with its thermistor 13 will be in the lowermost location. Consequently, when the float is in the operative position illustrated in FIG. 3, thermistor 12 is disposed in an air environment near the air-sea interface and thermistor 13 is disposed in a submerged condition. The air-sea interface is, of course, the surface of the ocean and is represented in FIG. 3 by line 17. Preferably the arrangement includes a small circular float which is so supported by outrigger 3 that line 17 bisects the float or, in other words, divides it into upper and lower hemispheres. In this manner, thermistors 12 and 13 are disposed equidistantly from the air-sea interface and the thermistors will maintain this fixed disposition even in a tossing, relatively violent sea since the float buoyantly rides the waves.

Another feature which has been mentioned involves the relatively small size of float member 4. The small size is most desirable to minimize the disturbance of the existing thermal structure. On the other hand, the float must be sufficient size to maintain flotation during operation which, in turn, means that the float must buoyantly support not only its own weight but the weight of such associated members as the thermistors and the outrigger. Another member carried by the float is a small sunshade 18 that covers and protects thermistor 12 from the direct rays of the sun.

The embodiment of FIG. 4 utilizes a plurality of temperature sensing arrays each of which includes a plurality of vertically spaced thermistors. Referring to this drawing, it will be seen that the FIG. 4 embodiment is similar in a number of respects to that of FIG. 3 in that it also is supported by the same outrigger member described with regard to FIG. 3 and the outrigger member supports a float 4 similar to the float of FIG. 3 except for the fact that the float of FIG. 4 must support additional weight and therefore its buoyancy must be adjusted to accommodate this weight. One pair of temperature arrays 11' is directly supported by float 4, while another pair of temperature arrays 20 is disposed outboard of the arrays or probes 11'. Temperature arrays or probes 11' include a plurality of vertically-spaced thermistors 21 and 22, these thermistors being mounted in appropriate cavities formed on fiberglass tubes or poles 23 and 24. Poles 23 and 24 extend upwardly and downwardly from the float and have their inner ends secured by sleeves 26 formed integrally with the float. Additional stability is provided by using a small hollow sphere 28 at the center of the float and coupling the ends of poles 23 and 24 to this sphere. In a preferred arrangement each of the arrays 11' includes about 10 thermistors and the poles may be about 100 cm in length so as to project upwardly into the air a distance of 100 cm as well as downwardly into the water the same distance. For practical purposes, the arrangement further includes a splash plate 29 and appropriate sun shields 31 are provided for thermistors 21.

Thermistor arrays 20 are, as already stated, disposed outboard of arrays 11' and for this purpose, arrays 20 are mounted on tubular poles 32 and 33 supported by a horizontally extending tubular pole 34. As seen, pole 34 has its inboard end supported by float 4 and also engages inner sphere 28 of the float. Its outboard end is provided with appropriate brackets or other mounting means for maintaining outboard poles 32 and 33 in the desired vertical disposition. Poles 32 and 33 also carry a plurality of vertically-spaced thermistors 36 and 37 and thermistors 36 are protected by appropriate sun shields 38. Most suitably, outboard poles 32 and 33 are about 50 cm in length so that these thereimistors project upwardly into the air a distance of 50 cm as well as downwardly into the water. Again, about 10 thermistors are used in each array.

The arrangement of FIG. 4, of course, is heavier and costlier than that of FIG. 3, although the resulting operational advantages may outweight these factors. Thus, the FIG. 4 arrangement provides temperature data at spaced locations, the outboard array being spaced approximately 4 feet from the inboard array. The comparative readings provide useful data. Additionally, since the outboard array is not supported by a float, its temperature readings are affected to even a lesser extent by disturbances in the thermal structure. Obviously, the arrays of both FIGS. 3 and 4 function in a similar manner to the extent that float 4 supports the arrays in their vertical disposition with sufficient buoyancy to ride the ocean waves and maintain the thermistors in fixed positions relative to the sea surface. Both embodiments also have the advantage of providing structure for not only protecting the thermistors but also protecting the conductors which communicate the sensing elements with the telemetering system of the buoy. Thus, as may be noted particularly in FIG. 4, each thermistor is coupled back into the buoy through an electrical conduit or cable 40 and tubular structure of the pole supporting the thermistors as well as the float and the outrigger permits cable 40 to be lead into the buoy in a fully-protected disposition.

The advantages of the present apparatus have been indicated in the foregoing detailed description. The primary advantage is that the arrangement permits air-sea interface temperature readings which are accurate and which can be obtained continuously over a long period of time. The accuracy, in turn, is due to the fact that the thermistors are constantly maintained at fixed positions relative to the sea surface and the readings obtained by the thermistors are representative of actual temperatures undisturbed by surrounding structures. In other words, temperature arrays located near a buoy or ship provide readings which sometimes are inaccurate due to the fact that the ship or buoy structure affects the environment in which the readings are being obtained. The use of the outrigger places these arrays at a sufficient distance from the buoy to assure that such inaccuracies are avoided. Additionally, the outrigger with its float permits the arrays to ride the waves so as to obtain readings at the proper level.

Obviously many modifications and variations of the present invention are possible in the light of the above teachings. It is therefore to be understood that within the scope of the appended claims the invention may be practiced otherwise than as specifically described.

We claim:

1. Apparatus for determining the vertical profile distribution of air and water interface temperatures at the sea surface comprising:
   a floating platform,
   an elongate tubular outrigger member having an inboard end pivotally supported by said platform,
   a small float member carried by the outboard end of the outrigger member,
   a pair of thermistor means carried by said float member, and
   electrical conduit means coupling said pair of thermistor means to said floating platform,
   said outrigger member being supported by said platform for free-swinging motion about a horizontal axis and said outrigger float member being sufficiently small to minimize sea-water disturbances and sufficiently buoyant to floatably support said free-swinging outrigger member with only the lower half of the float submerged in the water,
   said pair of thermistor means being carried one on the upper half of the float and the other on its lower half whereby said thermistor means maintain a constant distance from the sea surfaces and for determining temperature conditions at said constant distances as said float rides said sea surface.

2. The apparatus of claim 1 wherein said electrical conduit means extend through the interior of said float and of said tubular outrigger member for maintaining their dispositions and for providing environmental protection.

3. The apparatus of claim 2 wherein said float member is spherical and has a diameter of about four inches.

4. The apparatus of claim 2 wherein said pair of thermistor means each are in the form of a vertically-spaced array of thermistors,
   said apparatus further including tubular support members carried by said float in vertically-extending dispositions,
   said thermistor arrays being carried by said vertically extending support members.

5. The apparatus of claim 4 wherein said thermistor arrays extend upwardly and downwardly from said air-sea interface line approximately a distance of 100 cm.

6. The apparatus of claim 5 further including a second pair of thermistor arrays extending upwardly and downwardly from said air-sea interface line,
   said second pair of arrays being carried by said float outboard of said first pair of arrays.

7. The apparatus of claim 6 further including a second pair of vertically-extending tubular support members for said second pair of arrays, and
   a horizontal tubular member supportably coupling said second pair of vertically-extending tubular members to said float.

8. The apparatus of claim 7 wherein said electrical conduit means for said first and second thermistor arrays extend through the interior of said tubular support members.

9. The apparatus of claim 8 further including means for shielding said thermistors from sunlight, and
splash guard means mounted on one of the tubular support members above the float for minimizing the effect of water on thermistors disposed in the air environment.

* * * * *